United States Patent [19]

Eigenbrod

[11] Patent Number: 4,918,927
[45] Date of Patent: Apr. 24, 1990

[54] CRYOGENIC LIQUID CONTAINER

[75] Inventor: Lester K. Eigenbrod, Indianapolis, Ind.

[73] Assignee: Harsco Corporation, Wormleysburg, Pa.

[21] Appl. No.: 403,374

[22] Filed: Sep. 6, 1989

[51] Int. Cl.[5] .............................................. F17C 1/00
[52] U.S. Cl. .................................... 62/45.1; 220/446; 220/465
[63] This Application is a Division of Ser. No. 07/265,903, Nov. 2, 1988.
[58] Field of Search .................. 62/45.1; 220/446, 465

[56] References Cited

U.S. PATENT DOCUMENTS

| | | | |
|---|---|---|---|
| 2,951,348 | 9/1960 | Loveday et al. | 62/50 |
| 3,191,795 | 6/1965 | Molnar | 220/445 |
| 3,274,788 | 9/1966 | Hoffman et al. | 62/45.1 |
| 3,514,006 | 5/1970 | Molnar | 62/445 |
| 4,548,335 | 10/1985 | Remes et al. | 220/446 |
| 4,674,289 | 6/1987 | Andonian | 62/45.1 |

Primary Examiner—Ronald C. Capossela
Attorney, Agent, or Firm—Kerkam, Stowell, Kondracki & Clarke

[57] ABSTRACT

A container for storing liquefied gas and for delivering the liquefied gas in either gas or liquid form is provided, the container having an inner vessel which holds the liquefied gas and an outer shell spaced apart therefrom, creating an evacuable spae between the inner vessel and outer shell. The inner vessel is suspended from the outer shell by a necktube. An upper necktube support structure which minimizes necktube damage or rupture from impact or other lateral forces includes a lateral support disc extending across a space between a cylindrical collar surrounding a portion of the necktube and the interior surface of the upper head of the outer vessel. The lateral support disc and the cylindrical collar are spaced apart by an insulative annular sleeve, while the disc is supported at its peripheral edge on insulative bosses and is spaced from an insulative ring extending around the circumference of the interior surface to provide a double heat break. A lateral support structure of similar design is provided at a lower end of the inner vessel. The container further employs a heat exchanger integral with the wall of the outer vessel, a gas line withdrawal conduit telescoped within a liquid line withdrawal conduit, and an economizer circuit which affords simplicity of design and ease of manufacture.

15 Claims, 4 Drawing Sheets

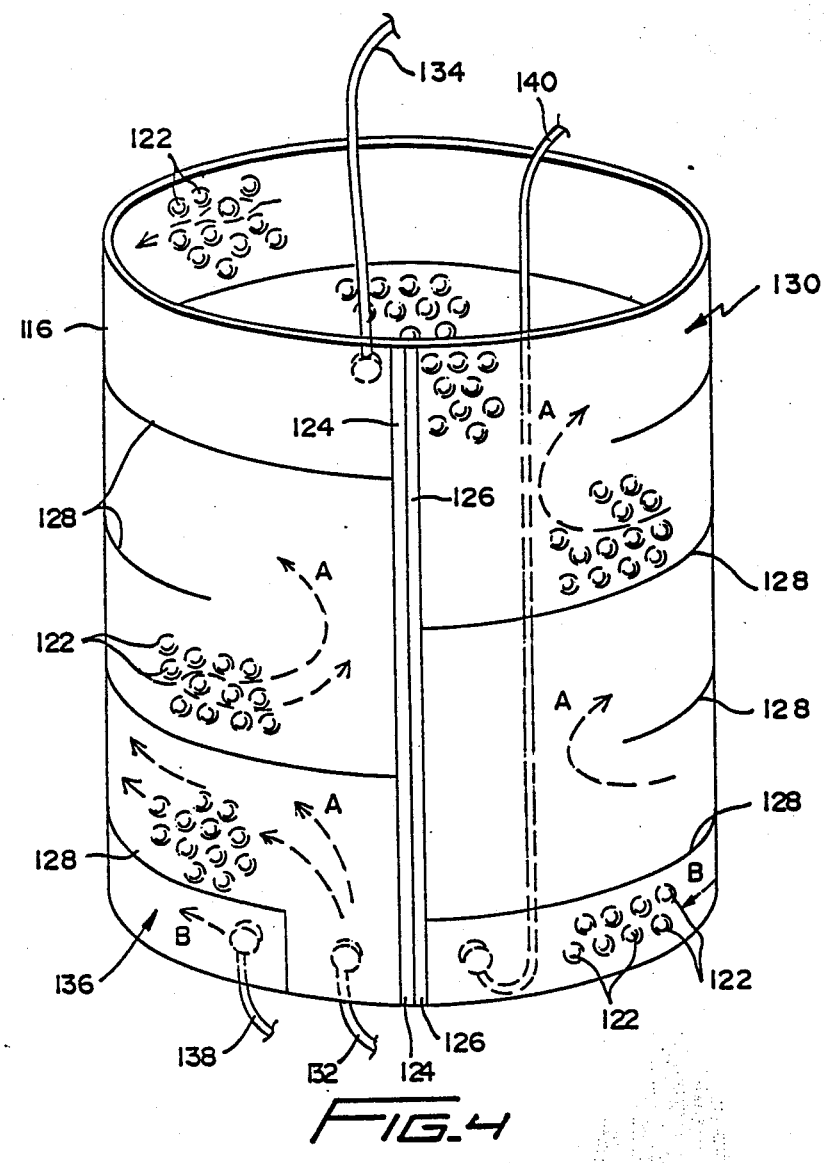
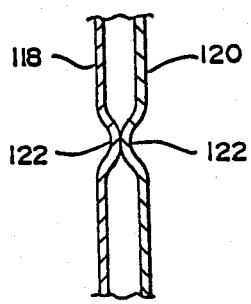 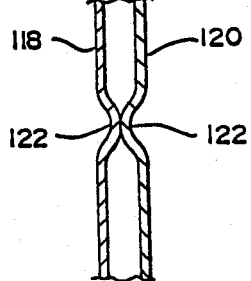 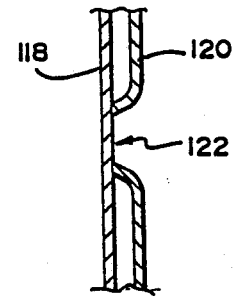

CRYOGENIC LIQUID CONTAINER

This is a divisional of application Ser. No. 265,903, filed Nov. 2, 1988.

BACKGROUND OF THE INVENTION

1. Field of the Invention

The present invention is directed to liquefied gas containers and more particularly to containers for storing and delivering liquefied gas in either gas or liquid form.

2. Description of Related Art

Heretofore, containers for low temperature liquefied gas have included an inner stainless steel shell that contains the low temperature liquefied gas and an outer stainless steel or carbon steel shell that encloses the inner shell and is sealed to it. The space between the shells is evacuated and the connections and support structures between the inner and outer shell are held to a minimum, because each such connection and structure is a conduit for heat transfer. It has been the practice to provide a passage or channel at the top of the container from the outside to inside the inner shell through a thin wall stainless steel tube, sometimes called a necktube, that is sealed to an opening in the inner shell and projects through and is sealed to an opening in the outer shell. The thin wall tube provides access to the inner shell from outside of the container and is thin walled so that it will be a minimum conductor of heat from the outer shell to the inner shell.

One of the problems with such prior containers is that the top end of the inner shell is supported within the outer shell only by the necktube. This suspension, with no support at the bottom of the container, acts like a pendulum when the container falls on its side or is otherwise laterally impacted, and the necktube will often kink, buckle or crack. When the container is tilted, the necktube will often break or rupture. If the inner shell is also supported by the outer shell at the bottom of the container, the bottom support can be of very sturdy construction and made of low thermal conductivity material. Where such a lower or bottom support is used, the lateral forces on the necktube at the top when the container is tipped may be worse, because the inner shell cannot swing as a pendulum within the outer shell and the necktube tries to assume a reverse bend which results in maximum flexural stress and possible fracture.

A primary problem encountered in attempting to provide increased protection of the necktube is that such protection generally requires additional areas of contact between inner components and the outer shell, thus creating additional conduction paths between either the neck tube or the inner shell and the outer shell. Prior attempts to provide improved support of the inner shell or vessel for protection against necktube rupture can be seen in U.S. Pat. No. 4,674,289, to Andonian, and U.S. Pat. No. 4,538,445, to Remes.

The Andonian patent employs a fairly intricate suspension arrangement of the inner vessel in an attempt to provide improved protection against rupture of the necktube. The Andonian container employs a necktube which extends from the inner shell opening through the outer shell opening and attaches to an external flange. Surrounding the necktube and extending downwardly from the external flange is a second cylindrical support tube having a larger diameter than the necktube thereby leaving a space between the tubes. The outer support tube is sealed to the opening in the outer vessel, and extends inwardly therefrom in a telescoping manner with respect to the necktube. The support tube carries an inwardly extending annular bumper which contacts the necktube at a reinforced section of the necktube near the joint with the inner shell.

A disadvantage of this support is that the intricacy of the design makes fabrication of such vessels more difficult. Additionally, the necktube in the Andonian patent is not completely disposed within the outer shell, and extends upwardly through an opening in the upper head, where it is surrounded only by the support tube. Such a design may result in increased thermal losses to the atmosphere compared with designs wherein the necktube is disposed completely within the confines of the outer shell.

The Remes patent employs an annular abutment extending from a wall of the outer vessel across the space between the outer vessel and inner vessel, but short of contact with the inner vessel wall. While such a design avoids the complexity of the necktube connection shown in Andonian, it possesses the disadvantage that the annular abutment or ring contacts the wall of the outer vessel around the entire circumference thereof. Thus, although direct contact between the inner container and the annular abutment will not generally occur, movement of the inner container relative to the outer shell will cause the insulation between the inner container and the annular abutment to be compacted and damaged resulting in increased thermal losses. Such compaction of the insulation may occur either as a result of minor or major impacts to the container causing the inner vessel to shift with respect to the outer vessel, or the contact could be the result of out-of-tolerance manufacturing.

Another feature of prior containers is that the vaporizer circuit is generally a copper tube encircling the inner shell several times like a coil to provide a large surface area for conducting heat form the outer shell into the liquid to vaporize it as it is drawn through the copper tube. At the top of the container the copper tube connects to a stainless steel tube that penetrates and is welded to the outer shell and then to a gas output valve outside the container. This configuration of the vaporization coil has the drawback that the coils occupy space between the inner and outer vessels, making for a tighter fit, which may preclude the use of more compact container designs.

The copper vaporizer coil, in the container described above, is soldered to the inside of the stainless steel or carbon steel outer shell. In order to solder these metals, corrosive flux must be used which leaves a residue which must be cleaned, adding to the manufacturing cost of the container. Further, if the joint is not correctly cleaned, the remaining residue may later produce gases in the vacuum, reducing the effectiveness of the vacuum space. Furthermore, maximum thermal utilization of available surface area is normally compromised to avoid using excessive lengths of copper tubing.

It is therefore a principal object of the present invention to provide a liquefied gas container having an improved lateral support structure extending between the outer and inner vessels for preventing damage to the necktube.

A further object of the present invention to provide a liquefied gas container with such an improved support structure which has the further advantage of reducing or substantially eliminating the thermal conduction paths associated with the support structure.

Another object of the present invention to provide a lateral support structure for enhancing protection of the necktube which employs a floating support disc having a double heat break between a collar surrounding the necktube and the interior wall or upper head of the outer shell.

Still another object of the present invention to provide a liquefied gas container having an inner vessel surrounded by an outer shell capable of delivering the gas in both liquid and gaseous forms, the container having a vaporizer circuit for vaporizing the liquefied gas, the vaporizer circuit being integral with the wall which forms the outer shell.

It is a further object of the present invention to provide a liquefied gas container having an improved bottom mounted gas withdrawal line feeding the vaporizer circuit.

It is a further object of the present invention to provide a liquefied gas container having improved gas and liquid withdrawal circuits wherein a gas withdrawal line is disposed telescopically within a liquid withdrawal line.

It is still a further object of the present invention to provide a liquefied gas container having an improved economizer circuit utilizing a constant bleed orifice, the circuit being in communication with an upper container gas space and the gas line circuit.

Another object of the present invention is to provide an improved liquefied gas container having two walls sealed together and evacuated between the walls for low heat transfer constructed such that a liquid is drawn from the container either through a heat exchanger by which it is converted to a gas and fed on demand as a gas or directly without heat exchange as a liquid to a user. The advantage of such containers over conventional high pressure gas containers for the same gas is that the gas is stored as a low (cryogenic) temperature liquid at a relatively low pressure and the volume of the liquid stored is substantially less than would be the volume of the high pressure gas in conventional high pressure containers.

SUMMARY OF THE INVENTION

The above and other objects of the present invention and the attendant advantages are accomplished by a container for liquefied gas having an outer shell and an inner vessel with an evacuable space therebetween, a necktube suspending the inner vessel from an opening in the outer vessel to provide an opening through the outer vessel to the interior of the inner vessel, an upper lateral support, and optionally, a lower lateral support, which provide increased protection for the thin-walled necktube against rupture caused by exposure to lateral forces developed as a result of impact, tipping over, dropping or the like. At the same time, the necktube support structures in the present invention provide increased resistance to heat loss through solid thermal conduction paths.

The upper lateral support is made up of a short, tube-like support collar designed to surround a portion of the necktube, and being spaced apart therefrom. The support collar connects to the necktube at a lower extent in the interior of the inner vessel. Providing this extended section in the interior of the inner vessel allows a design having a necktube of increased length while not increasing overall container height.

The support collar in turn is surrounded by and spaced apart from an annular support disc having a central opening therein, the disc being adapted to rest on an upper surface of a plurality of retaining clips disposed at locations around the circumference of the interior wall of the upper head of the outer vessel. The annular support disc is spaced a short distance away from the interior wall, thereby providing a lateral support having a double heat break, a first heat break being effected between the support collar and the annular support disc, and the second heat break being effected at the spacing between the annular support disc and the interior wall of the outer vessel. The space between the support collar and the annular support disc is bridged by a loosely fitting annular sleeve made of a material which is a poor thermal conductor and is able to tolerate high temperatures, such as a polyimide. Likewise, the space between the annular support disc and the interior wall of the outer vessel may optionally be bridged by an insulative ring which is attached around the interior surface of the outer vessel.

Where a lower lateral support is also desired, a similar arrangement may be used, but no necktube is provided at the lower end of the vessel and a cylindrical trunnion support member extends downwardly from the bottom head of the inner vessel, about which a lower annular support disc is disposed. Again, a heat break is provided between the trunnion member and lower annular support disc. A second heat break may be provided at the outer periphery of the lower annular support disc by providing a seating surface at the interior of the lower head of the outer vessel, whereby a lower surface of the support disc will rest on the seating surface, but the peripheral edge of the disc will be spaced at a distance away from the lower head of the outer vessel. Alternatively, the disc may be attached directly to the interior wall of the lower head of the outer vessel if it is determined that a double heat break at the lower lateral support is not required.

Other features and advantages provided by the liquefied gas container of the present invention result in enhanced performance over container designs previously known in the art. The straight wall cylindrical portion of the outer vessel is constructed of a double wall expanded metal having at least one flow path running through the space between the walls, for use either in the vaporizer circuit, or in a pressure building circuit for liquid or gas delivery. The straight wall portion is advantageously formed having two separate flow paths, serving both the pressure building circuit and the vaporizer circuit. The use of the wall of the outer vessel itself for these purposes provides several advantages including increased thermal efficiency and low pressure drop.

A further improvement over containers previously employed is realized by positioning the conduit for sending liquid to the gas delivery circuit inside of the liquid delivery conduit, in a telescoping manner. In addition to providing cost savings associated with manufacture of the container, the telescoping design of the conduits works in combination with a novel economizer circuit. The telescoping design and the withdrawal of the liquid through the bottom of the vessel provides the necessary pressure drop for operation of the economizer circuit. The economizer circuit employs a constant bleed orifice and manual shut-off. The constant bleed economizer design has an advantage in that a user may adjust the pressure building circuit regulator setting, where desired, without having to reset an economizer regulator. In conventional containers, failure to perform this function correctly can result in operational problems. The economizer design has the further advantages of providing simplicity, reliability, and economy in manufacture, as compared with known economizer circuits.

BRIEF DESCRIPTION OF THE DRAWINGS

These and other features of the present invention and the attendant advantages will be readily apparent to those having ordinary skill in the art and the invention will be more easily understood from the following detailed description of the preferred emobodiments of the present invention, taken in conjunction with the accompanying drawings, wherein like reference characters represent like parts throughout the several views and wherein:

FIG. 4 is a substantially schematic perspective view of the wall of the outer shell of the container of the present invention with its integral vaporizer circuit and pressure building circuit.

DETAILED DESCRIPTION OF THE PREFERRED EMBODIMENT

Figure 1:
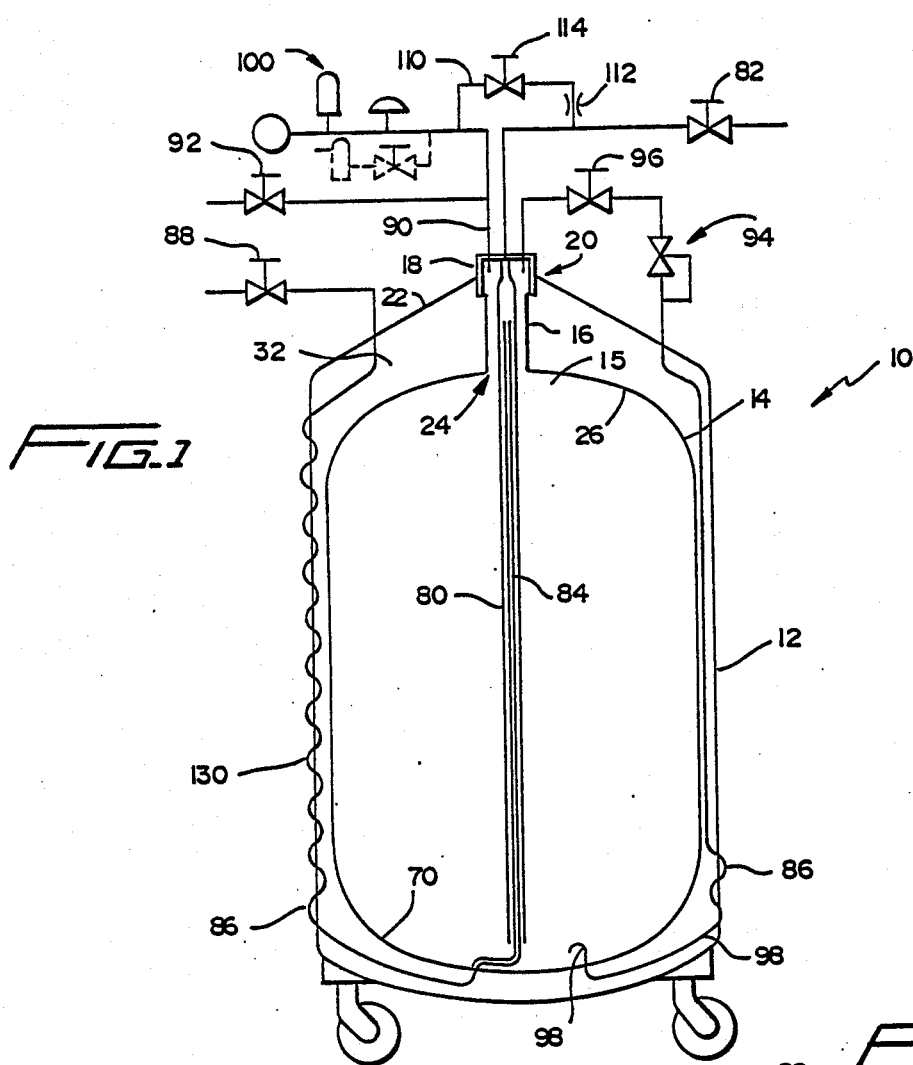
FIG. 1 is a schematic representation of the liquefied gas container according to a preferred embodiment of the present invention showing the various gas and liquid flow lines and circuits.
Figure 2:
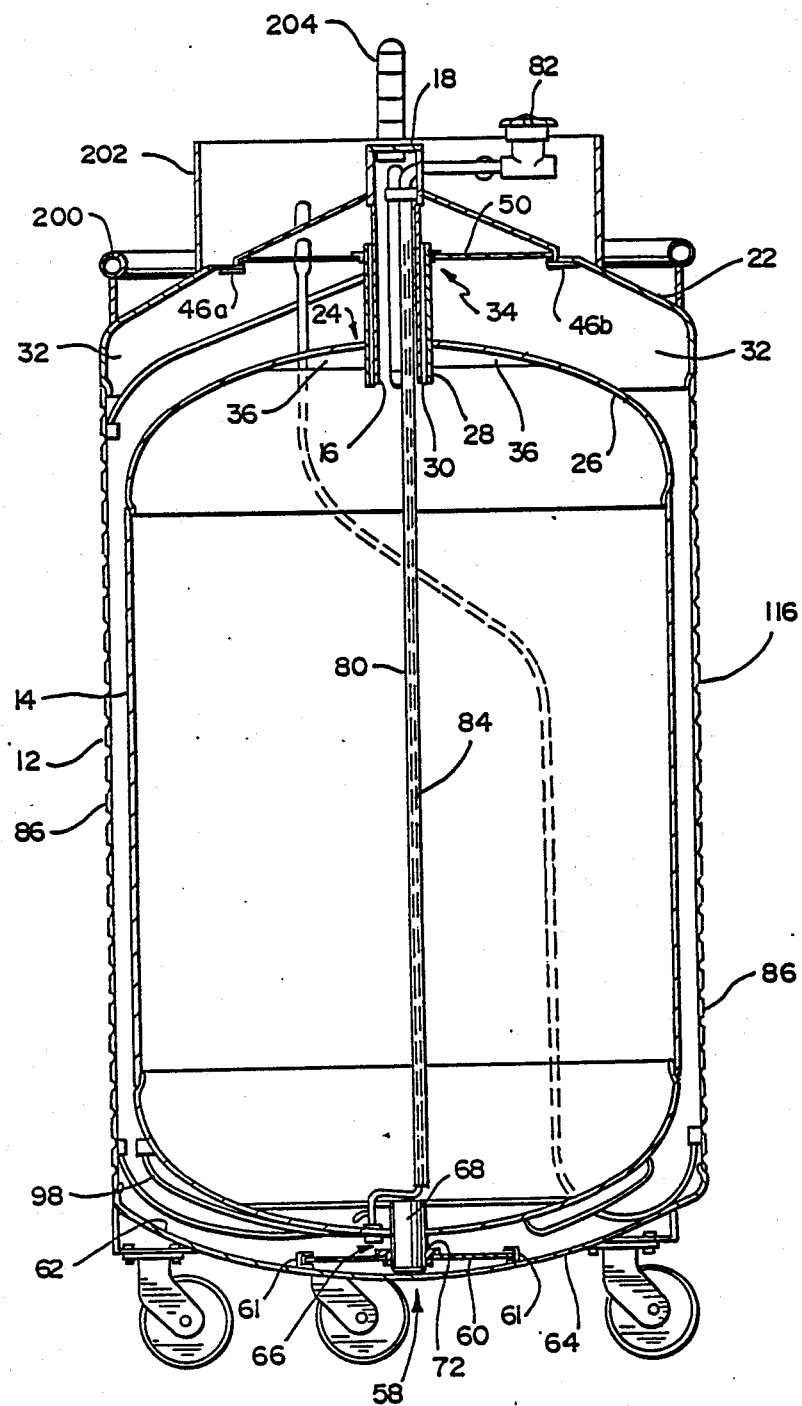
FIG. 2 is a cross-section view of the liquefied gas container of the present invention.

Referring initially to FIG. 1, a liquefied gas container in accordance with the present invention is depicted in schematic form, showing the various gas and liquid flow circuits also in schematic form, and is identified generally by reference character 10. FIG. 2 shows the container 10 in cross-section, depicting the structural details of the container.

As with many containers previously known in the art for holding a liquefied gas, such as liquid nitrogen, oxygen, or argon, at cryogenic temperatures, container 10 is provided with a cylindrical outer shell 12 surrounding an inner vessel 14. The inner vessel 14 is suspended from the outer shell 12 by a thin walled necktube 16 (see also FIG. 2). The liquefied gas is stored within inner vessel 14, the outer shell 12 providing a spaced apart barrier surrounding the inner vessel 14 thereby providing a space which may be evacuated and filled with insulation. In order to minimize the thermal conduction of heat between the atmosphere and the inner vessel 14, necktube 16 has a wall thickness which is preferably kept to a minimum by designing primarily for static loads in holding inner vessel 14 in suspension. This minimal wall thickness, however, leads to lower damage thresholds for the necktube when lateral or side forces are experienced.

Necktube 16 is connected to, at an upper end, a manifold 18 which serves as a mounting block for external plumbing connections of the various gas and liquid circuits referred to in general as fluid circuits. Manifold 18 is sealed to outer shell 12 at an opening 20 in an upper head 22 of outer shell 12. Manifold 18, is depicted diagrammatically in FIG. 1 as being formed of a circular disc having a short hollow cylindrical tube extending downwardly therefrom, however, the manifold may take various forms in practice.

As shown in FIG. 2, necktube 16 extends downwardly through an opening 24 at an upper head 26 of inner vessel 14. A cylindrical collar 28, having an internal diameter slightly greater than an external diameter of necktube 16, surrounds the necktube and is spaced apart therefrom. Necktube 16 and cylindrical collar 28 are joined and sealed at a lower extent by, for example, a seal and strength weld 30. Cylindrical collar 28 is joined to inner vessel 14, sealing opening 24 at the upper head 26 of the inner vessel. An evacuable space 32 is thus defined between outer shell 12 and inner vessel 14.

The evacuable space 32 is preferably provided with insulation material (not shown), of a type known in the art, such as a multilayer insulation system described in U.S. Pat. No. 4,481,779 to Barthel, the disclosure of which is herein incorporated by reference. Other insulation systems may also be suitable for various intended end uses. A vacuum condition is preferably developed in the evacuable space 32, and may be achieved in a manner such as that described in the Barthel patent. It is also highly desirable in many instances to heat the container during the evacuation process to temperatures on the order of 600° F., in order to drive out as much residual water or other gaseous contaminents as possible from evacuable space 32.

In the preferred embodiment of the present invention a necktube lateral support structure 34 (FIGS. 2 and 3) is provided which limits the amount of travel of the necktube 16 when lateral forces, such as those due to impact, are experienced. A double heat break, described in more detail below, is provided in the necktube lateral support structure, which contributes to the improved overall thermal performance of the container.

As can be seen in FIG. 2, the inner vessel 14 is suspended from outer shell 12 by a structure comprising manifold 18, necktube 16, and cylindrical collar 28. Cylindrical collar 28, is connected inside inner vessel 14 to a plurality of gussets 36 which preferably extend radially along an inner surface 38 of upper head 26 of inner vessel 14. Forces or bending moments which would normally be experienced at the collar/vessel joint are distributed over a larger area of the upper head 26, thereby increasing resistance to damage. The gussets 36 are spaced apart at intervals on the inner surface 38 of upper head 26, and four gussets spaced at 90° intervals may advantageously be provided, but more or less than four can be used.

Figure 3:
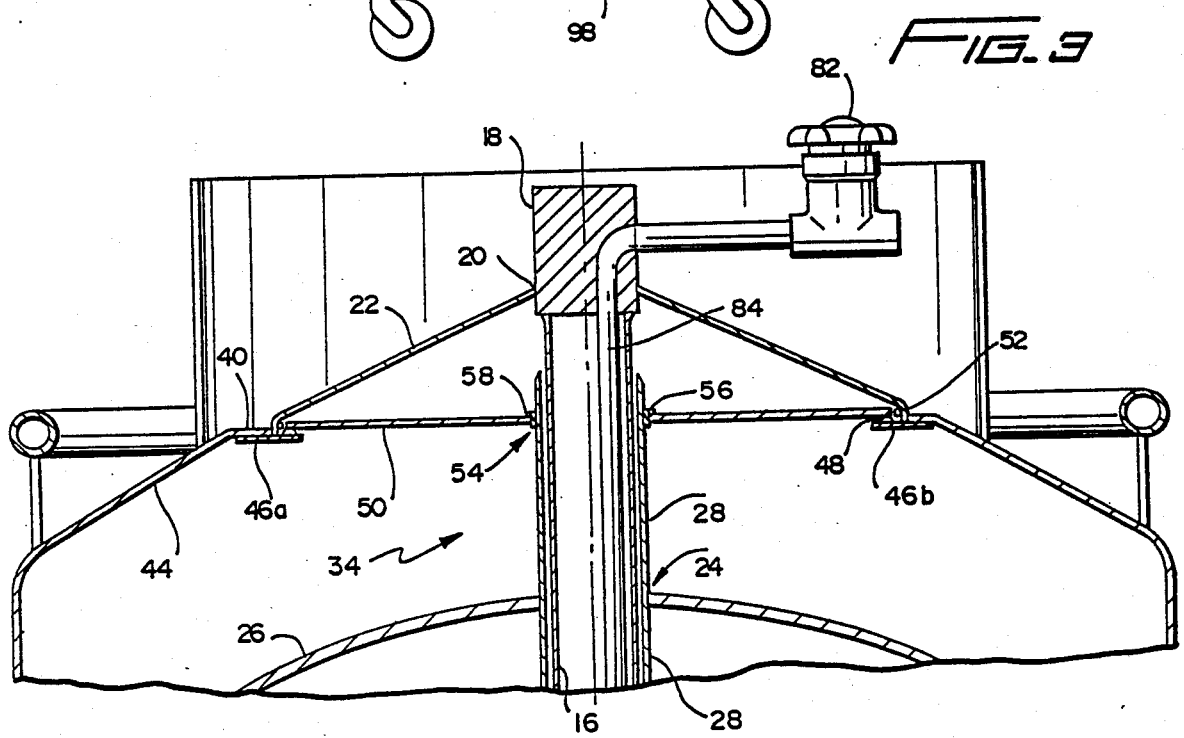
FIG. 3 is an exploded cross-sectional view of an upper portion of the liquefied gas container of the present invention showing details of the upper lateral support structure in accordance with a preferred embodiment.
Figure 3A:
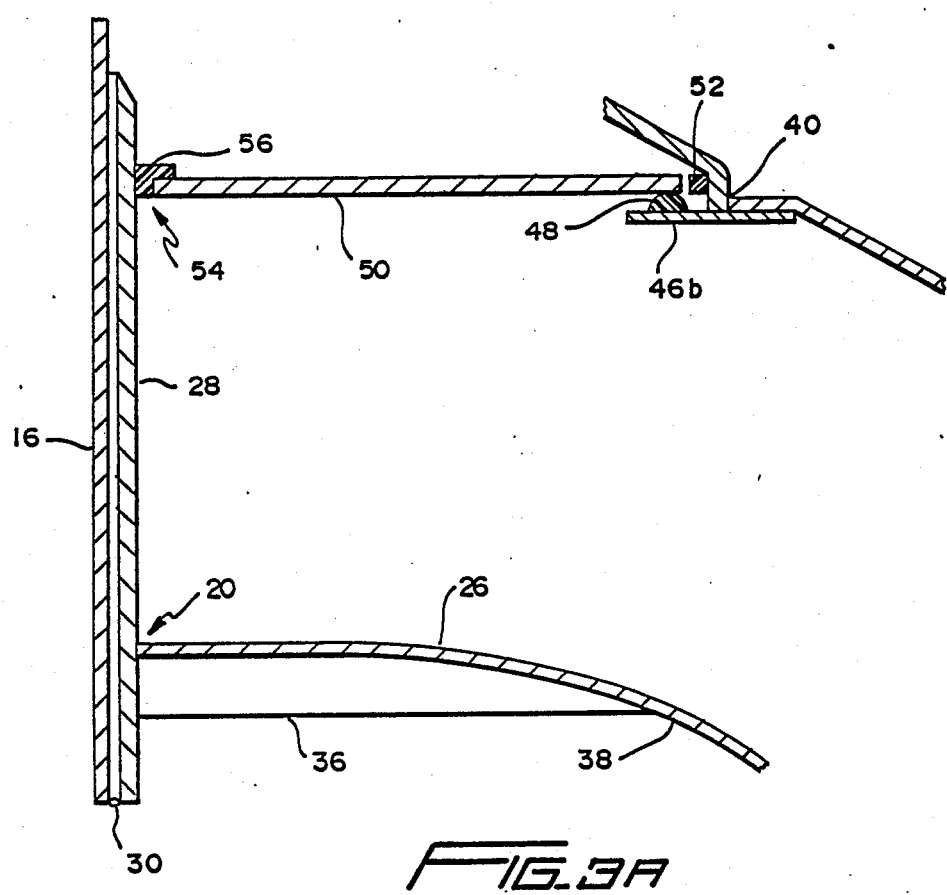
FIG. 3a is a further exploded cross-sectional view of the details of the upper lateral support structure.

Referring especially now to FIGS. 3 and 3a, the lateral support structure 34 near the upper portion of necktube 16, including its connection to manifold 18, is depicted. Manifold 18, shown in a solid block embodiment in FIG. 3 extends through an opening in upper head 22 of outer shell 12, and is sealed thereto around its perimeter. In the depicted embodiment of the present invention, upper head 22 of outer shell 12 approximates a conical shape having an annular step 40 formed on an inner surface 44 of upper head 22. Various other configurations of the upper head may, however, also be employed with the container of the present invention.

A lateral support disc 50 extends across the space between the interior surface 44 of upper head 22 and cylindrical support collar 28. At an outer peripheral edge, lateral support disc 50 is supported by load carrying members, depicted in FIGS. 3 and 3a as retaining clips 46a,b optionally carrying bosses 48, disposed to extend inwardly at the edges of annular step 40. The load carrying members are preferably designed to retain disc 50 at a predetermined vertical position, while allowing disc 50 to move freely in a lateral direction. Lateral support disc 50 has an outer peripheral dimension which is slightly less than the interior surface 44 peripheral dimension adjacent to disc 50, thereby leaving a small gap between the disc 50 and the surface 44. An insulative ring 52 made of a material which is a poor thermal conductor may optionally be provided around the periphery of the interior surface 44 at the same level at which lateral support disc 50 is disposed, and a peripheral edge of lateral support disc 50 will be spaced at a small distance from the ring 52.

Lateral support disc 50 has a central opening 54 which has a diameter slightly larger than an exterior diameter of cylindrical collar 28, thereby leaving an annular space between the support disc 50 and collar 28 when the disc 50 is centered. In the preferred embodiment, a spacer element in the form of an annular sleeve 56, made of a low conductivity material, is fitted into the annular space between support disc 50 and cylindrical collar 28. Sleeve 56 may loosely contact either support disc 50, cylindrical collar 28, or both, and the sleeve 56 is optionally provided with a radially extending tab 58 disposed on the sleeve to retain the sleeve in position with respect to support disc 50.

The structure employing support disc 50 and sleeve 56 and, optionally, insulative ring 52, thus substantially prohibits all but very small lateral movements of the necktube 16 and its surrounding collar 28 when forces tending to cause relative lateral movement between the inner vessel 14 and outer shell 12 are encountered. The upper head 22 of outer shell 12 thus experiences substantially no bending movement, which may eliminate the need to reinforce the upper head 22 adjacent the necktube. Potential damage to the necktube is further prevented or substantially reduced, as the cylindrical collar 28, gussets 36, and upper head 26 of inner vessel 14 widely distribute a substantial portion of such forces at the upper head of the inner vessel 14.

The design of the lateral support structure further has the advantage of reducing heat leak from the atmosphere to the inner vessel, by virtue of the substantial avoidance of metal-to-metal contact in the lateral support structure. The double heat break provided at the outer periphery of the lateral support disc 50 and at the inner opening 54 of the lateral support disc, provides substantial improvement in preventing heat leakage to the atmosphere, thereby contributing to improved container performance.

The material used to construct sleeve 56 and, where applicable, insulative ring 52 and bosses 48 must have low thermal conductivity properties in order to effect the double heat break described above. Various plastics, for example Micarta ® (Westinghouse Electric Corp.) which is a thermosetting plastic made up of fabric or paper impregnated with phenol-formaldehyde resin and formed into shape, have sufficiently low thermal conductivities and would be suitable for use. Polycarbonate, polysulfone, phenolics, and fluoroplastics such as PE-TFE, containing glass reinforcement, may also be suitable from a thermal conductivity standpoint.

As indicated previously, it will be highly desirable, and even necessary in some instances where a higher vacuum is desired with less moisture in the evacuable space 32, to heat the assembled container 10 to temperatures ranging up to about 600° F. while drawing the vacuum. Thus, the internal components must be capable of withstanding such temperatures. Many polymers, such as Micarta ®, which have traditionally been used for their low thermal conductivity properties lose their structural integrity at such temperatures, and for that reason are generally not suitable for use in such a container. Two important characteristics, in addition to low thermal conductivity and tolerance of high temperatures, for the material selected for sleeve 56 are that the material must not produce offgases when heated to temperatures on the order of 600° F., and in order to be suitable for use in oxygen service, must be non-flammable.

The container 10 of the present invention is therefore preferably provided with a sleeve 56 and optionally a spacer ring 52 made of a glass-reinforced polyimide material. Polyimides possess the low thermal conductivity required, will tolerate the high temperatures in the 600° F. range, and also possess the other desirable characteristics of non-flammability and not producing offgases when heated to such temperatures. The use, in the containers of the present invention, of glass-reinforced polyimide as a material of construction for sleeve 56 provides a substantial improvement in enabling the manufacture of containers having low moisture levels in the evacuable space. The phenolics and fluoroplastics will withstand temperatures in the 475°-500° F. range, and may prove to be suitable for use as well.

Container 10 may also be provided with a lower lateral support system 58 (FIG. 2), where further increased protection of necktube 16 is desired. A lower lateral support disc 60, similar in design to lateral support disc 50 is employed. Disc 60 has a central opening 66 designed to surround a bottom cylindrical trunnion 68 extending downwardly from the bottom head 70 of inner vessel 14. Lower disc central opening 66 is slightly larger in diameter than an external diameter of trunnion 68. As with upper necktube lateral support system 34, the annular space between opening 66 in lower lateral support disc 60 and trunnion 68 may be loosely fitted with a lower insulative annular sleeve 72, preferably fabricated of a glass reinforced polyimide material.

Although not shown in detail the Figures, the lower lateral support system 58 may be provided with a second heat break at or near the interior surface 62 of the lower head 64 of outer shell 12. In this embodiment, the support disc 60 may be supported at an outer periphery by lower retaining clips 61 attached to the interior surface 62 of outer shell 12 in a manner similar to the upper lateral support system 34. Similarly, an insulative ring may be disposed around interior surface 62 to surround support disc 60 and provide the second heat break between the outer shell 12 and trunnion 68.

Referring now to FIGS. 1, 2, and 3, and primarily FIG. 1, the operation of the gas and liquid circuits will be described. FIG. 1 shows the complete collection of circuits in schematic form, while several of the components are also depicted in FIGS. 2 and 3.

A liquid line circuit is made up of liquid delivery conduit 80, which is open at a lower end, and extends upwardly from a point near the lower head 70 of inner vessel 14, through manifold 18, terminating at manual control valve 82. This circuit is used to fill the container with a liquefied gas by connecting a pressurized source of the gas to control valve 82 and opening the valve to permit flow into the inner vessel 14. This circuit is also used in the reverse direction to dispense the liquefied gas in its liquid state.

A gas line circuit is represented in FIG. 1 by gas delivery conduit 84 which is open at an upper end and is disposed within liquid delivery conduit 80 in a substantially concentric, telescoping manner. Liquid delivery conduit 80 thus actually operates as a component of both the liquid and gas line circuits. The gas delivery conduit 84 extends downwardly through lower head 70 of inner vessel 14 and connects to a first path of heat exchanger 86, which in the preferred embodiment is formed integrally with the wall of outer shell 12. Gas control valve 88 controls the delivery of the liquefied gas in its gaseous form, the liquid gas being warmed to near-ambient temperature and thus vaporized during travel through heat exchanger 86.

The provision of a gas delivery conduit 84 having its inlet at an upper opening disposed within liquid delivery conduit 80 results in the inlet seeing a reduced pressure as a result of the liquid being "lifted" within liquid delivery conduit 80 to the inlet. The attendant pressure drop created by this design permits the use of a novel economizer circuit to be described in more detail later.

A vent line circuit is provided primarily for use in conjunction with the liquid line circuit during the filling operation, comprising a vent line conduit 90 and a normally closed manual vent valve 92. The conduit 90 extends through manifold 18 into the upper gas containing portion 15 of inner vessel 14. The vent valve 92 controls the venting of vapor during "pressure transfer" liquid fill, and may alternatively be used to reduce container pressure by manually venting to the atmosphere. Vent line circuit 90, 92 may also be used as an inlet line to the container for "pump transfer" liquid fill. A pressure relief circuit 100 of essentially conventional design is also in communication with the upper portion of the inner vessel 14.

A pressurizer or pressure building circuit is provided to assist in the delivery of gas and liquid products through their respective lines. A control regulator 94 and control valve 96 regulate a flow of fluid from pressure building conduit 98 extending from lower head 70 of inner vessel 14 through a second path of heat exchanger 86. The liquefied gas drawn from inner vessel 14 and flowing through this heat exchanger 36 is warmed and then returned to the inner vessel through control valve 96 and manifold 18. As will be discussed in more detail, the pressure building conduit 98 and second path of heat exchanger 86 are located at the lowest region of the container to take maximum advantage of the liquid hydrostatic head in the inner vessel 14.

The container of the present invention is further provided with a novel economizer circuit which operates by way of a substantially continuous controlled gas bleed from the upper container gas space to the gas line circuit. The gas bleed is accomplished by employing a bleed conduit 110, having a constant bleed orifice 112 or other fixed flow restriction disposed therein, the conduit 110 being preferably connected between vent line 90 and liquid delivery conduit 80. The economizer circuit is driven by the pressure drop created in the gas line circuit by the arrangement of the telescoping liquid and gas delivery conduits. The use of a constant bleed orifice 112, preferably sized to operate continuously, eliminates the need to provide a conventional adjustable regulator for the economizer circuit. The economizer circuit of the present invention provides improved reliability in that the combination economize and pressure build functions are controlled by the pressure building regulator only, whereas, in known conventional economizer circuits, adjustments to the pressure building circuit often require that the economizer regulator also be adjusted.

Economizer control valve 114 is provided to permit manual shutoff of the economizer circuit during periods of liquid delivery. The simplicity of the design of the economizer circuit affords lower manufacturing costs, in addition to the improved reliability.

Referring back to FIG. 2, it can be seen that a handling ring 200 and a protecting ring 202 are provided at the upper end of container 10. Protecting ring 202 is preferably a cylindrical metal ring which is attached to upper head 22 and surrounds most of the externally disposed conduit and valves, or "plumbing" to protect these components against inadvertent bumps and the like. Also depicted as extending upwardly from manifold 18 and visible in FIG. 2 is a contents gauge 204, preferably made of polycarbonate or other similar tough and transparent material. The contents gauge permits the checking of the liquid levels in the container, and is easily seen from most angles.

Figure 5D:
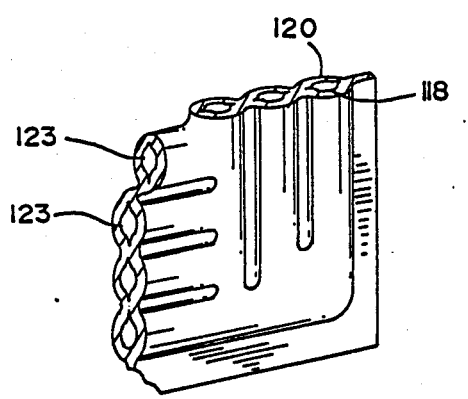
FIGS. 5 a, b, c, d are exploded views of a cross-section of the wall of the outer shell showing four different embodiments of the double wall construction.

FIGS. 4 and 5 a, b, c, d depict an integral wall heat exchanger which provides improved performance in gas and liquid delivery over containers previously known in the art. FIG. 4 shows, in somewhat schematic form, the straight sidewall section 116 forming the part of outer shell 12 which extends between and is attached to upper head 22 and lower head 64. This straight sidewall section 116 is made of an expanded metal sheet which, as best seen in any of FIGS. 5 a, b, c, d is a wall made up of two spaced apart metal sheets 118, 120 which are bonded together at intermittent points, thus giving the appearance of a plurality of dimples 122 spaced apart on the exterior of the straight sidewall 116. The straight sidewall section 116 is thus capable of permitting fluid flow through the spaces 123 between the metal sheets 118, 120.

The expanded metal sheet is formed into a cylindrical shape to form sidewall 116, and edges 124, 126 may be joined by seam welding or other joining method to form the complete wall. Also in the preferred embodiment, flow barriers 128 are provided in predetermined areas in the space 123 between the metal sheets 118, 120, creating fluid flow paths traversing through the wall, and forming two separate heat exchange paths.

The sidewall section 116 thus constructed is capable of performing as an integral wall heat exchanger 86 for the gas line circuit and the pressure building circuit of the container 10. The portion of heat exchanger 86 which services the gas line circuit is termed a vaporizer 130. Vaporizer 130 handles liquefied gas delivered from gas delivery conduit 84 (FIG. 2) to gas dispensing circuit inlet 132, and as the liquefied gas passes through the vaporizer 130, as shown by arrows A, heat exchange with the external atmosphere warms the liquefied gas, thereby vaporizing it into its gaseous phase. In the vaporizer 130, it can be seen that the flow barriers 128 disposed therein form a tortuous path for the gas flow extending from a lower portion of the sidewall to an upper portion of the sidewall, also indicated by arrows A.

The gas dispensing circuit outlet 134 is connected to gas line control valve 88 (FIG. 1) for delivery in gaseous form. Utilizing the sidewall 116 section of the outer shell 12 as an integral vaporizer 130 results in high thermal efficiency and low pressure drop, which are often limiting factors in increasing the peak gas flow delivery rate and/or delivery pressure. Additionally, use of the sidewall 116 itself as the heat exchange medium eliminates substantial lengths of conduit lines, the conduit lines being required to provide sufficient heat exchange surface to effect the vaporization of the gas.

Table I presents product data showing the improved gas withdrawal capacity, as well as the normal evaporation rate, of the container of the present invention as compared to data reported by manufacturers of three other containers of approximately the same capacity.

TABLE I

| Manufacturer | Model | Storage Capacity (Liters) | Gas Withdrawal Capacity (CFH) | Normal Evaporation Rate %/Day in $N_2$ |
|---|---|---|---|---|
| Present Invention (Taylor-Wharton) | 240 Plus | 243 | 500 | 1.1 |
| MVE | DURA-TECH | 240 | Unpublished | 1.5 |
| Cryo. Svcs., Inc. | PLC-230A | 230 | 350 | 2.2 |
| Andonian Cryogenics | GP-240 | 240 | 350 | 1.5 |

A second heat exchange path 136 is formed at the lower portion of sidewall 116. This path 136 is part of the previously described pressure building circuit, which is employed to boost the pressure in the inner vessel 14 for aiding in the delivery of the stored product in gas or liquid form. Where increased pressure is needed in delivery of the stored product, liquefied gas is drawn from a lower section of inner vessel 14 through conduit 98 by opening pressure control valve 96 and pressure control regulator 94. Conduit 98 connects to pressure building circuit inlet 138, and the liquefied gas passes into heat exchanger second path 136. The liquefied gas travels circumferentially around the path 136 located at the lower end of sidewall 116 section, as indicated by arrows B, and is consequently warmed by heat transfer with the atmosphere. The gas, which is substantially vaporized, exits through pressure building circuit outlet 140, and through regulator 94 and valve 96, and is returned to the upper gas containing portion 15 of inner vessel 14 at a pressure less than the liquid at the bottom of the container, but at a higher pressure than the gas occupying the top of the container. The pressure building circuit, including heat exchange path 136, being located near the lower end of the vessel, takes advantage of the hydrostatic head of the liquefied gas stored in the inner vessel 14 to more effectively drive the system gas flow back through manifold 18 at the upper portion 15 of inner vessel 14.

The expanded metal used to form integral wall heat exchanger 86 may be made in any of several known configurations marketed under tradenames such as TempPlate and PlateCoil. Depicted in FIGS. 5 a, b, c, d, are examples of a "double embossed", a "single embossed", a "dimpled" and a "double embossed platecoil" configuration, respectively, of an expanded metal. In nearly all known applications of expanded metal panels used as heat exchangers the product to be heated or cooled contacts the exterior plate side of the panel. However, in the present invention, the liquefied gas product to be heated and vaporized is introduced into the spacings 123 between sheets 118, 120 to undergo heat transfer with the atmosphere at the exterior plate side of outer shell 12. Using the internal passages 123 of the expanded metal, in combination with the use of the flow barriers, permits an integral wall heat exchanger to be constructed having two or more flow circuit paths therethrough.

The foregoing description includes various details and particular structures according to a preferred embodiment of the present invention, however, it is to be understood that this is for illustrative purposes only. Various modifications and adaptations may become apparent to those of ordinary skill in the art, without departing from the spirit of the present invention. Accordingly, the scope of the present invention is to be determined by reference to the appended claims.

What is claimed is:

1. A container for storing liquefied gas comprising:
    an inner vessel having an upper head, a lower head and a sidewall extending between said upper and lower head, said upper head having an opening therethrough;
    an outer shell having an upper head, a lower head and a sidewall extending between said upper and lower head, said upper head of said outer shell having an opening therethrough;
    a necktube extending between said opening in said upper head of said outer shell and said opening in said upper head of said inner vessel, said necktube connected to said opening in said outer shell; and
    an upper lateral support structure comprising a collar disposed to surround said necktube at a portion of said necktube near said inner vessel, said collar being spaced apart from said necktube at a predetermined distance along its length and joined to said upper head of said inner vessel and support means for limiting an amount of lateral movement of said collar and said necktube, said support means extending substantially across a space between said collar and an interior surface of said outer shell, said support means being spaced apart from said collar and from said interior surface of said outer shell at a predetermined distance therefrom.

2. The container of claim 1 wherein said support means comprises a disc having an opening substantially at a center thereof, said opening being larger than an outer peripheral dimension of said collar, said opening further having substantially the same geometry as the peripheral surface of said collar, and wherein an outer periphery of said disc is spaced from said interior surface of said outer shell.

3. The container of claim 2 wherein said support structure further comprises a plurality of retaining clips connected to said outer shell, and extending inwardly therefrom, said retaining clips being disposed to permit said disc to rest on an upper surface of said clips.

4. The container of claim 3 including a sleeve disposed in said space between said disc and said collar, said sleeve being made of a material which is a poor thermal conductor.

5. The container of claim 4 wherein said sleeve is made of a glass reinforced polyimide material.

6. The container of claim 4 including an insulative ring disposed around a periphery of said interior surface of said outer shell in said space between said interior surface and said disc, said ring being made of a material which is a poor thermal conductor.

7. The container of claim 6 wherein said insulative ring is made of a glass reinforced polyimide material.

8. The container of claim 3 wherein said retaining clips include an insulative boss for supporting the disc adjacent the outer peripheral edge.

9. The container of claim 2 further comprising a lower lateral support structure having a trunnion extending downwardly from said lower head of said inner vessel, a lower support disc having an opening substantially at a center thereof, said opening being larger than an outer peripheral dimension of said trunnion and having substantially the same geometry as a peripheral surface of said trunnion, said trunnion extending through said opening and spaced apart therefrom, a sleeve disposed in a space between said trunnion and said lower support disc, said sleeve being made of a material which is a poor thermal conductor, and wherein an outer periphery of said lower disc is supported near an interior surface of said lower head of said outer shell.

10. The container of claim 1 wherein said collar is sealed to said opening in said upper head of said inner vessel, said collar extending a predetermined distance into an interior of said inner vessel, and wherein said necktube extends through an interior portion of said collar and is joined to said collar at a lower extent of said collar and said necktube, said collar further extending a predetermined distance upwardly from said upper head of said inner vessel.

11. The container of claim 10 wherein an upper end of said necktube is sealed to a manifold, and said manifold is joined to said outer shell at said opening in said upper head, a joint between said outer shell and said manifold sealing said outer shell from an exterior atmosphere, said manifold being adapted to permit communication of at least one fluid circuit therethrough.

12. The container of claim 11 wherein said support means comprises a disc having an opening substantially at a center thereof, said opening being larger than an outer peripheral dimension of said collar, said opening further having substantially the same geometry as the peripheral surface of said collar, and wherein an outer periphery of said disc is spaced from said interior surface of said outer shell, and said support structure further comprises a plurality of retaining clips connected to and extending inwardly from said outer shell, said retaining clips being disposed to permit said disc to rest thereupon.

13. The container of claim 12 wherein a sleeve is disposed in said space between said disc and said collar, said sleeve being made of a material which is a poor thermal conductor.

14. The container of claim 13 wherein an insulative ring is disposed around a periphery of said interior surface of said outer shell in said space between said interior surface and said disc, said ring being made of a material which is a poor thermal conductor.

15. The container of claim 1 wherein said support means comprises at least one spacer element made of a glass reinforced polyimide material.

* * * * *